United States Patent
Yang (10) Patent No.: US 8,965,457 B2
(45) Date of Patent: Feb. 24, 2015

(54) METHOD AND APPARATUS FOR CONTROLLING AN ELECTRONIC DEVICE DISPLAY FOR PRESENTING INFORMATION ON SAID DISPLAY

(75) Inventor: Lianghua Yang, Kitchener (CA)

(73) Assignee: Blackberry Limited, Waterloo (CA)

( * ) Notice: Subject to any disclaimer, the term of this patent is extended or adjusted under 35 U.S.C. 154(b) by 1247 days.

(21) Appl. No.: 10/913,345

(22) Filed: Aug. 9, 2004

(65) Prior Publication Data
US 2006/0030369 A1    Feb. 9, 2006

(51) Int. Cl.
  H04W 88/02  (2009.01)
  H04W 4/16   (2009.01)
  H04M 1/725  (2006.01)
  H04M 1/57   (2006.01)

(52) U.S. Cl.
  CPC .......... *H04M 1/72522* (2013.01); *H04M 1/575* (2013.01)
  USPC .......................................... 455/566; 455/415

(58) Field of Classification Search
  USPC ............. 455/566, 556, 550, 466, 456.1, 14.1, 455/416, 415, 414.1, 414.2, 414.3, 414.4, 455/414.5, 414.6; 435/566, 556, 550
  See application file for complete search history.

(56) References Cited

U.S. PATENT DOCUMENTS

| | | | |
|---|---|---|---|
| 5,956,655 A | 9/1999 | Suzuki et al. | |
| 6,442,263 B1 * | 8/2002 | Beaton et al. | 379/142.04 |
| 6,516,202 B1 * | 2/2003 | Hawkins et al. | 455/556.2 |
| 6,608,637 B1 | 8/2003 | Beaton et al. | |
| 6,691,111 B2 * | 2/2004 | Lazaridis et al. | 707/6 |
| 6,697,083 B1 * | 2/2004 | Yoon | 345/658 |
| 6,757,372 B1 * | 6/2004 | Dunlap et al. | 379/142.17 |
| 6,781,575 B1 * | 8/2004 | Hawkins et al. | 345/173 |
| 6,868,283 B1 * | 3/2005 | Bonansea et al. | 455/566 |
| 7,007,239 B1 * | 2/2006 | Hawkins et al. | 715/780 |
| 7,046,994 B1 * | 5/2006 | Padawer et al. | 455/415 |

(Continued)

FOREIGN PATENT DOCUMENTS

DE    10140874 A1    3/2003
EP     0860969 A2    8/1998

(Continued)

OTHER PUBLICATIONS

Canadian Examination Report mailed on Oct. 15, 2012, issued for Canadian Application No. 2,512,065 (English).

*Primary Examiner* — Khawar Iqbal
(74) *Attorney, Agent, or Firm* — Oblon, Spivak, McClelland, Maier & Neustadt, L.L.P.

(57) ABSTRACT

A method and apparatus for presenting information is provided. In an embodiment, an electronic device with wireless telephony features is provided. The display of the device is divided into at least two regions. The first region is reserved for presenting status information about the device, including such information as battery life, signal strength, time and date, carrier information, and the like. The second region is reserved for use by applications, such as at least a main menu application and an incoming telephone call application. When an incoming call arrives, the main menu application presented on the second region is replaced with the incoming call information, but the status information remains unchanged. As the status of the incoming call changes from unanswered to answered, only a portion of the second region is updated, as a remaining portion of the second region remains the same and indicates that an incoming call is being processed.

21 Claims, 8 Drawing Sheets

(56) References Cited

U.S. PATENT DOCUMENTS

| | | | |
|---|---|---|---|
| 7,120,470 B2 * | 10/2006 | Oota et al. | 455/566 |
| 7,171,236 B2 * | 1/2007 | Heo | 455/556.2 |
| 7,366,547 B2 * | 4/2008 | Hasegawa et al. | 455/566 |
| 7,551,899 B1 * | 6/2009 | Nicolas et al. | 455/73 |
| 7,738,912 B1 | 6/2010 | Hawkins et al. | 455/550.1 |
| 2002/0022503 A1 * | 2/2002 | Lee | 455/566 |
| 2002/0039914 A1 * | 4/2002 | Hama et al. | 455/566 |
| 2002/0042288 A1 * | 4/2002 | Nakayama | 455/553 |
| 2002/0058527 A1 * | 5/2002 | Kawasaki et al. | 455/550 |
| 2002/0086661 A1 * | 7/2002 | Rouse et al. | 455/412 |
| 2002/0123368 A1 | 9/2002 | Yamadera et al. | |
| 2002/0183091 A1 * | 12/2002 | Heo | 455/556 |
| 2003/0013483 A1 * | 1/2003 | Ausems et al. | 455/556 |
| 2003/0073430 A1 * | 4/2003 | Robertson et al. | 455/416 |
| 2003/0100347 A1 * | 5/2003 | Okada et al. | 455/567 |
| 2003/0181228 A1 * | 9/2003 | Kim | 455/575.3 |
| 2004/0021697 A1 * | 2/2004 | Beaton et al. | 345/810 |
| 2004/0203674 A1 * | 10/2004 | Shi et al. | 455/415 |
| 2004/0242279 A1 * | 12/2004 | Costanzo et al. | 455/564 |
| 2005/0143135 A1 * | 6/2005 | Brems et al. | 455/564 |
| 2005/0153745 A1 * | 7/2005 | Smethers | 455/566 |
| 2005/0188312 A1 * | 8/2005 | Bocking et al. | 715/739 |
| 2006/0015819 A1 * | 1/2006 | Hawkins et al. | 715/780 |
| 2006/0030371 A1 * | 2/2006 | Tanaka et al. | 455/566 |
| 2007/0218943 A1 * | 9/2007 | Takeuchi | 455/556.1 |
| 2009/0220068 A1 * | 9/2009 | Vialle et al. | 379/216.01 |
| 2012/0052846 A1 * | 3/2012 | Vander Veen | 455/413 |

FOREIGN PATENT DOCUMENTS

| | | |
|---|---|---|
| EP | 0872994 A1 | 10/1998 |
| EP | 1418735 A2 | 5/2004 |

* cited by examiner

METHOD AND APPARATUS FOR CONTROLLING AN ELECTRONIC DEVICE DISPLAY FOR PRESENTING INFORMATION ON SAID DISPLAY

FIELD OF INVENTION

The present invention relates generally to electronic devices and more particularly to a method and apparatus for presenting information thereon.

BACKGROUND

The functionality originally separately found in personal digital assistants ("PDAs"), cellular telephones, paging devices, and wireless email devices are increasingly being integrated into a single enhanced electronic device ("EED"). Research In Motion Limited of Waterloo, Ontario, Canada, and PalmOne, Inc. of Milpitas, Calif. USA are two examples of manufacturers of such enhanced wireless electronic devices, and each offer a variety of products in this category.

Because of the myriad of complex functions that are offered in EEDs, it is important that users are presented with an ergonomically friendly user interface, to allow the user to navigate through various EED functions and access desired features. This can be particularly important where the EED is used for conducting telephone calls or other types of live communications. In the example of an incoming telephone call, a user may, for example, have to react quickly to caller-ID display information, in order to decide whether to answer the call before the call is automatically forwarded to a voice-mail system. Accordingly, it is important that the user be able to easily ascertain the nature of the information about the incoming call to react appropriately. This need to react quickly is further compounded when there is an incoming "call-waiting" type call while a first call is being conducted. The user will want to assess whether to accept the second call while not unduly disrupting the flow of conversation in the first call. While efforts are made in existing EEDs to provide ergonomically friendly interfaces, it is noted that in many prior art EEDs radical changes occur to the information that is presented on the display during an incoming call. For example, a "home" screen is often presented when there is no incoming call. That home screen will present the user with a number of icons representing applications that can be accessed on the EED. If the user happens to be viewing such a screen when an incoming call occurs, the home screen is often completely replaced with a notice of the incoming call. Such radical changes can be jarring and/or bewildering to certain user, requiring them to process a completely new set of information while being under time constraints to choose how to react to the incoming call.

SUMMARY OF THE INVENTION

It is an object of the present invention to provide a novel display that obviates or mitigates at least one of the above-identified disadvantages.

According to one aspect of the present invention, there is provided a method of presenting information on an electronic device comprising the steps of presenting a first set of information in a first region and presenting a different set of information in a second region. The different information corresponds to an application that is active in said device. The first set of information is maintained regardless of said active application.

The first set of information can be status information about said device. The electronic device can include wireless telephony functionality and the first set of information is status information includes a signal strength between said device and at least one wireless base station serving said device.

A method and apparatus for presenting information is provided. In an embodiment, an electronic device with wireless telephony features is provided. The display of the device is divided into at least two regions. The first region is reserved for presenting status information about the device, including such information as battery life, signal strength, time and date, carrier information, and the like. The second region is reserved for use by applications, such as at least a main menu application and an incoming telephone call application. When an incoming call arrives, the main menu application presented on the second region is replaced with the incoming call information, but the status information remains unchanged. As the status of the incoming call changes from unanswered to answered, only a portion of the second region is updated, as a remaining portion of the second region remains the same and indicates that an incoming call is being processed. By updating only portions of the display as different applications, and events within those applications occur, the user is presented with substantially smooth transitions in information, thereby reducing confusion of the user as the user chooses how to interact with the device.

An aspect of the invention provides a method of presenting information on an electronic device having a display comprising the steps of presenting a first set of information in a first region of the display and then presenting a second set of information in a second region of the display. The second set of information typically corresponds to an application that is active in the device. The first set of information is typically presented in the first region regardless of the active application. The first set of information may be device status information, such as remaining battery life, the carrier operating the at least one wireless base station, a telephone number of the device, a main menu application and an incoming call application for receiving incoming telephone calls, a main menu application, or a current time and date. The electronic device can include wireless telephony functionality and the first set of information can be status information that includes a signal strength between the device and at least one wireless base station serving the device. The applications can include a main menu application and an incoming call application for receiving incoming telephone calls. The second set of information for the main menu application can include a plurality of icons selectable by a user to activate an application available on the device.

The first region may occupy varying portions of the display. For example, the first region may occupy between about twenty percent and about eighty percent or some other portion of the area of a display on which the information is presented.

The second set of information for the incoming telephone calls can include dividing the second region into two sub-regions, a first one of the sub-regions for displaying a notification that an incoming call is pending, and a second one of the sub-regions for displaying call answering options before the call is answered and the second one of the sub-regions for displaying in-call options once the call is answered.

Another aspect of the invention provides a method of presenting information on a telephonic electronic device having a display, the method comprising the first step of: presenting a first set of information in a first region of the display. The first set of information typically corresponds to a first application for presenting operational status of the device. Another step in the method is presenting a second set of information in a second region of the display. The second set of information typically corresponds to a second application that is active in the device while maintaining presentation of the first set information in the first region. Another step in the method is the presenting a third set of information in the second region when a second application is invoked in place of the second application. The third set of information typically corresponds to a third application that is active in the device while maintaining presentation of the set of status information in the first region.

The third application can be a telephony application for managing incoming telephone calls to the device. The third set of information can include at least one of an incoming telephone call notification, a phone number of an incoming caller and a name of an incoming caller.

The operational status information can include at least one of a signal strength between the device and at least one wireless base station serving the device, a time and date, a battery-life indicator, a carrier identifier, and a phone number associated with the device.

Another aspect of the invention provides a computer-readable storage medium containing a set of instructions for an electronic device having a display, the set of instructions characterized by the step of presenting a first set of information in a first region of the display. The first set of information typically corresponds to a first application for presenting operational status of the device. Another step in the set of instructions comprises presenting a second set of information in a second region of the display. The second set of information typically corresponds to a second application that is active in the device while maintaining presentation of the first set information in the first region. Another step in the method comprises the step of presenting a third set of information in the second region when a second application is invoked in place of the second application, the third set of information corresponding to a third application that is active in the device while maintaining presentation of the set of status information in the first region.

Another aspect of the invention provides a telephonic electronic device comprising a display for presenting information to a user and a microcomputer operable to present a first set of information in a first region of the display. The first set of information typically corresponds to a first application executing on the microcomputer and is for presenting the operational status of the device. The microcomputer is further operable to present a second set of information in a second region of the display. The second set of information typically corresponds to a second application that is active in the device while maintaining presentation of the first set information in the first region. The microcomputer is further operable to present a third set of information in the second region when a third application is invoked in place of the second application. The third set of information typically corresponds to the third application. The execution of the third application occurs while maintaining presentation of the first set information in the first region.

BRIEF DESCRIPTION OF THE DRAWINGS

Certain embodiments will now be described, by way of example only, with reference to the attached figures, wherein.

DETAILED DESCRIPTION OF THE INVENTION

Figure 1:
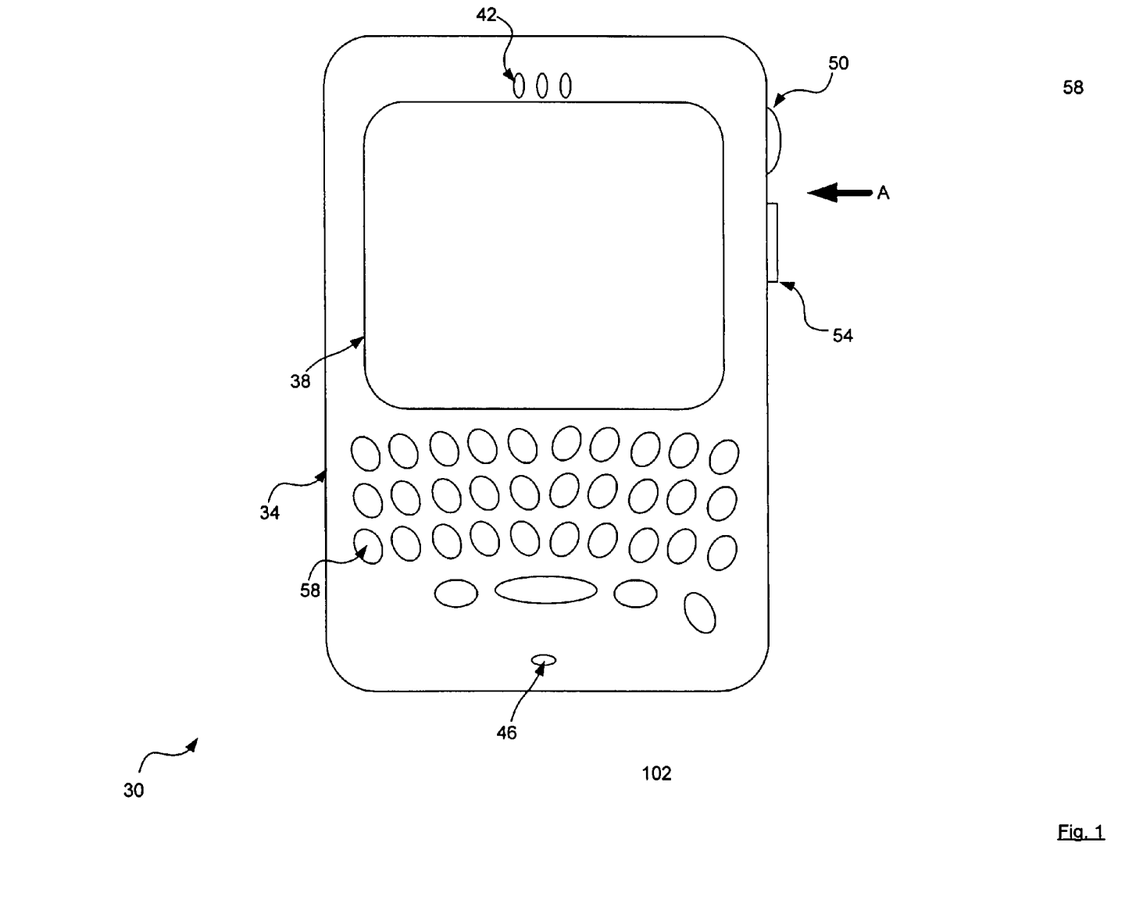
FIG. 1 is a schematic representation of an enhanced electronic device in accordance with an embodiment of the invention.

Referring now to FIG. 1, an enhanced electronic device ("EED") in accordance with an embodiment of the invention is indicated generally at 30. In the present embodiment, device 30 is based on the computing environment and functionality of a personal digital assistant with wireless voice telephony capabilities. However, it is to be understood that device 30 can be based on the construction and functionality of any mobile electronic device that can be connected to a wireless network. Such devices include cellular telephones or laptops computers connected to wireless networks. In a present embodiment, electronic device 30 includes, a housing 34, which frames an LCD display 38, a speaker 42, a microphone 46, a trackwheel 50, an exit key 54 and a keyboard 58. Trackwheel 50 and exit key 54 can be inwardly depressed along the path of arrow "A" as a means to provide additional user-input. It will be understood that housing 34, can be made from any suitable material as will occur to those of skill in the art.

Figure 2:
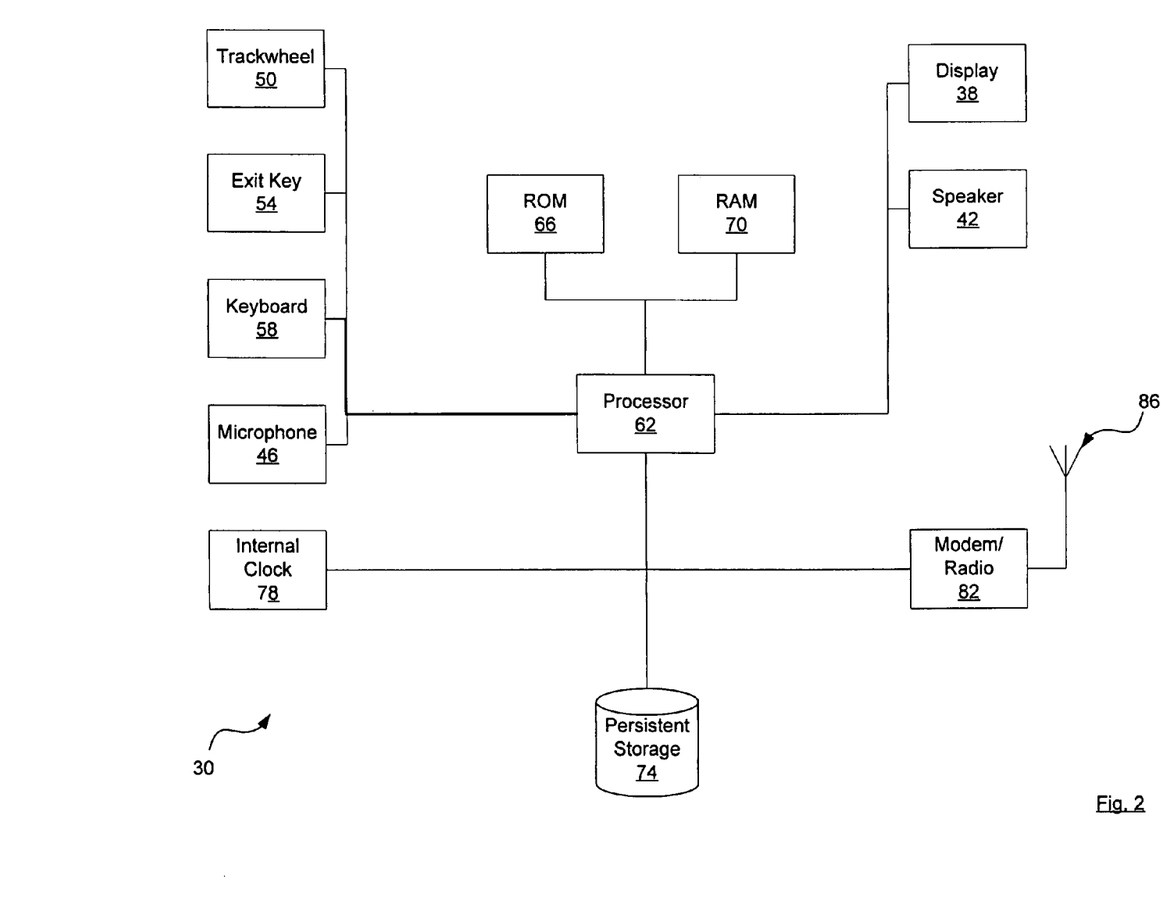
FIG. 2 is a block diagram of certain internal components of the device of FIG. 1.

Referring now to FIG. 3, a block diagram of certain internal components within device 30 are shown. Device 30 is based on a microcomputer that includes a processor 62. Processor 62 is connected to a read-only-memory ("ROM") 66, which contains a plurality of applications executable by processor 62 that enables device 30 to perform certain functions. Processor 62 is also connected to a random access memory unit ("RAM") 70 and a persistent storage device 74 which is responsible for various nonvolatile storage functions of device 30. Processor 62 can send output signals to various output devices including display 38 and speaker 42. Processor 62, can also receive input from various input devices including microphone 46, trackwheel 50, exit key 54 and keyboard 58. Processor 62 is also connected to an internal clock 78 and a modem and radio 82. Modem and radio 82 are operable to connect device 30 to one or more wireless base stations in range of device 30, in the usual manner, via an antenna 86.

Figure 3:
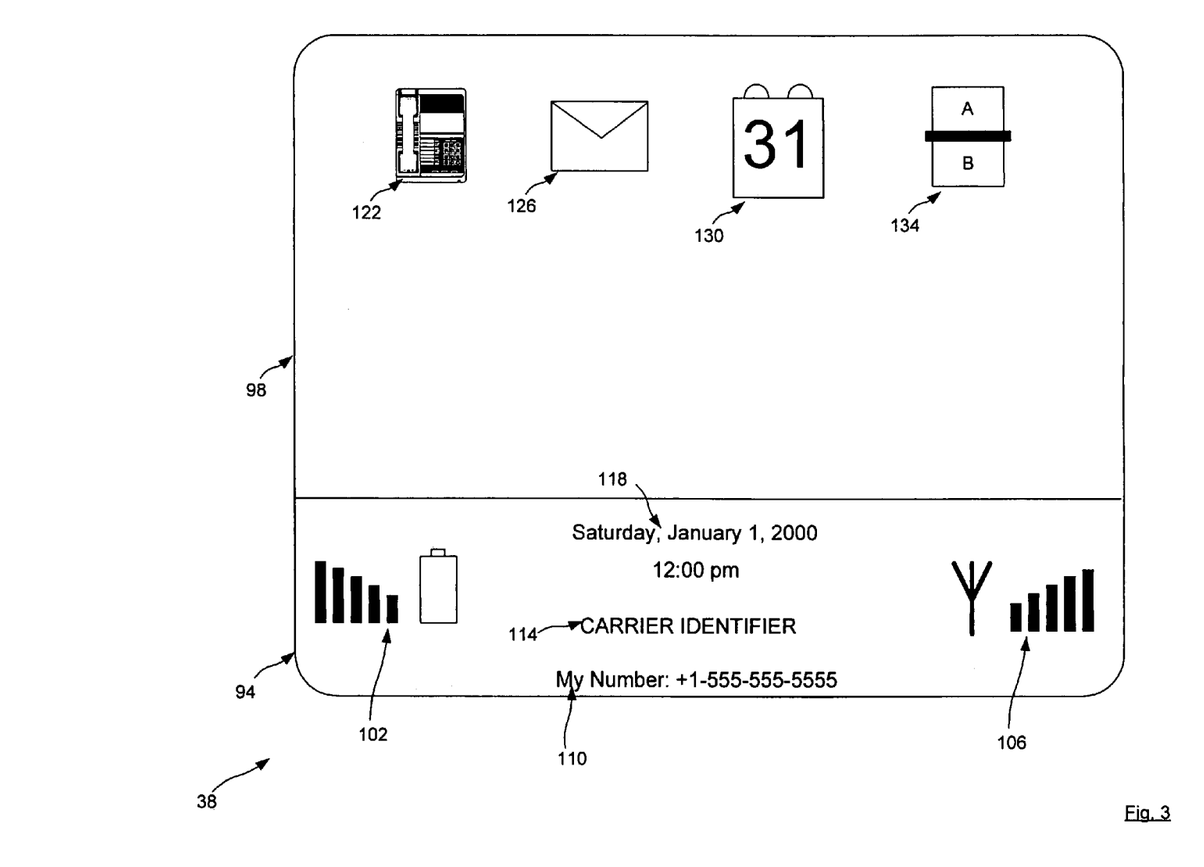
FIG. 3 is a representation of certain information being presented on the display of FIG. 1.

Referring now to FIG. 3, a main menu screen 90 from a main menu application stored on persistent storage device 74 and executed on processor 62 is shown on display 38. Main menu screen 90 is characterized by a first region 94 and a second region 98. First region 94 presents status information about device 30 and connectivity with the carrier that provides wireless services to device 30. Second region 98 presents a menu of choices of applications that can be executed on device 30.

More particularly, in a present embodiment the status information presented in first region 94 includes a battery status indicator 102, a signal strength indicator 106, a telephone number indicator 110, a carrier identifier 114, and a time and date indicator 118. Battery status indicator 102 identifies the amount of battery life remaining in device 30. Signal strength indicator 106 indicates the strength of the wireless signal (if any) with the carrier that provides service to device 30. Telephone number indicator 110 indicates the telephone number of device 30, i.e. the telephone number that if dialed by another telephone would cause device 30 to "ring". Carrier identifier 114 identifies the name of the carrier that provides service to device 30. Time and date indicator 118 identifies the current time and date. While a specific set of status information is shown in relation to first region 94, it is to be understood that such status information is exemplary and different combinations, orientations and/or types of status information can be shown, as desired. As will be explained in greater detail below, in a present embodiment, the particular set of status information in first region 94, and its layout, remain substantially static regardless of the application being accessed on device 30, an example of such an application being the different incoming-call stages of a telephone application.

The menu of choices of applications presented in second region 98 may include two, three, four, or more applications, such as a telephone application 122, a messaging application 126 (e.g. email and/or short message service), a calendar application 130 and an address book application 134. Telephone application 122 allows a user of device 30 to conduct a voice telephone call. Email messaging application 126 allows a user to send and receive email messages. Calendar application 130 allows a user to manage calendar appointments. Address book application 134 allows a user to manage contact information. While a specific set of applications are shown in second region 98, it is to be understood that such applications are exemplary and different combinations and/or types of offerings of applications can be shown, as desired, according to the features and applications associated with device 30.

In a present embodiment, first region 94 may occupy between about twenty percent and about eighty percent or some other portion of the area of a display on which the information is presented. In the present embodiment, second region 98 occupies the remainder of the area of display 38. Information that is included on region 98, but which does not fit due to the amount of display 38 allocated thereto, can be made available by allowing the user to scroll through that particular region 98. The portion of the display occupied by a region, such as first region 94 or second region 98, may be adjustable.

A method of presenting telecommunication information in accordance with another embodiment of the invention will now be discussed with reference to the flowchart shown in FIG. 4, and is indicated generally at 500. In order to assist in the explanation of method 500, reference will be made to the foregoing discussion of device 30. However, it is to be understood that method 500 and/or device 30 can be varied, and need not work in conjunction with each other.

Beginning first at step 510, status information is presented in the first region. When implemented on device 30, this step is represented in FIG. 3 as region 94, as previously described, is rendered on display 38. It will be understood, of course, that the exact information presented depends on the status of the device 30, and that the information in region 94 of FIG. 3 is purely exemplary. Having presented this information, this information is continuously updated, at appropriate times or intervals, as the remaining steps in steps 500 are performed, as part of the regular operation of device 30.

Next, at step 515, a regular application is presented in the second region. As used herein to explain the present embodiment, "regular application" refers to any application other than an application in device 30 that processes incoming phone calls. Continuing with the present example, when implemented on device 30 this step is represented in FIG. 3 as region 98, as previously described, is rendered on display 38. Again, it will be understood, of course, that the exact information presented depends on the menu of the device 30, and that the information in region 98 of FIG. 3 is purely exemplary. Having presented this information, this information is continuously updated, as appropriate, and the user is able to navigate through this screen and execute such other application as desired, as part of the regular operation of device 30. It should now be apparent that the performance of steps 510 and 515, from the perspective of the user, are virtually simultaneous.

In the present example being discussed in relation to method 500, it is assumed that the only application being presented at step 515 is the main menu application previously described. Thus, when method 500 advances from step 515 to step 520, a determination will be made at step 520 as to whether an incoming telephone call is being received by device 30. If "No", there is no incoming call, then method 500 will cycle back to step 515 which is performed as previously described.

Figure 5:
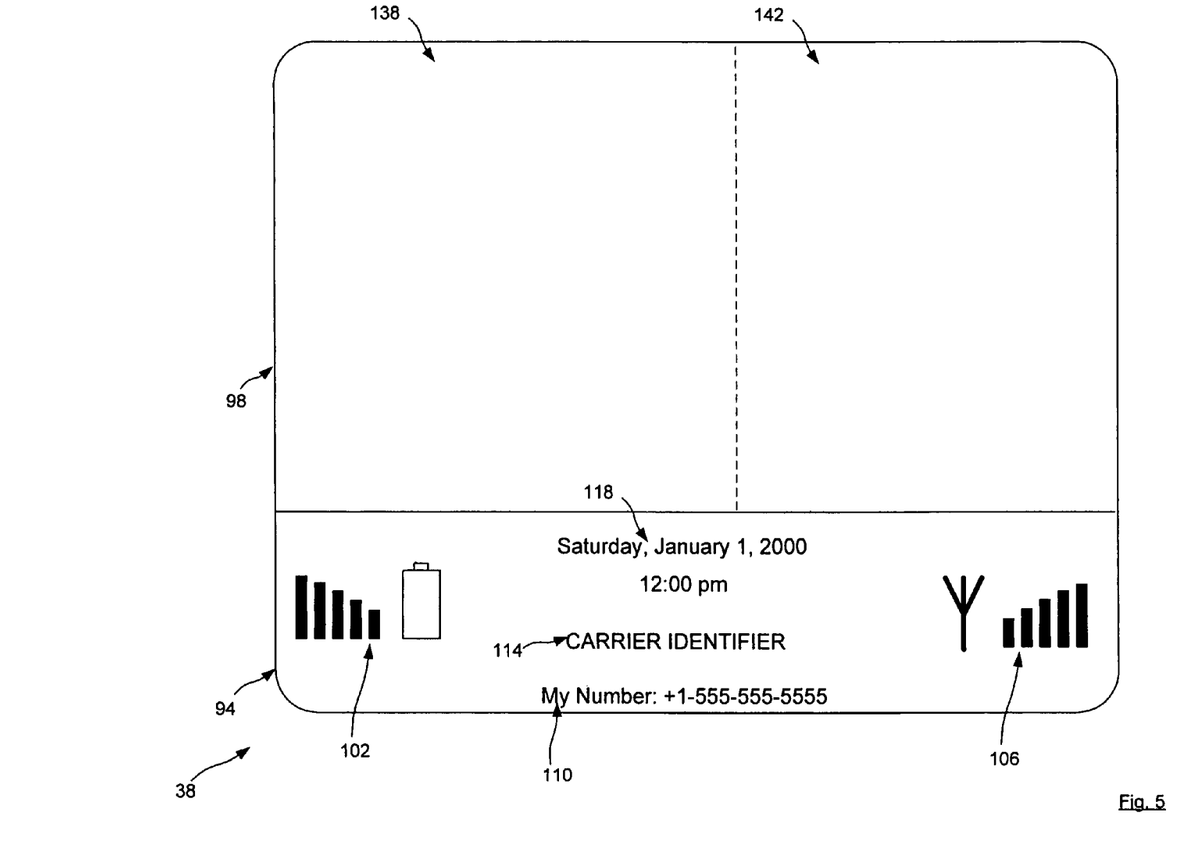
FIG. 5 is a representation of certain information being presented on the display of FIG. 1 during the performance of the method of FIG. 4.

However, if at step 520 it is determined that there is an incoming telephone call, then method 500 will advance to step 525, at which point area 98 will be divided into sub-regions. This step is represented in FIG. 5, as display 38 is shown having area 98 divided into a first sub-region 138 and a second sub-region 142. Generally, the first sub-region 138 is approximately the same size as the second sub-region 142. The sizes of the first and second sub-regions 138 and 142 may be scaled relatively to each. For example, first sub-region 138 may be ½ the size of the second sub-region 142.

Figure 6:
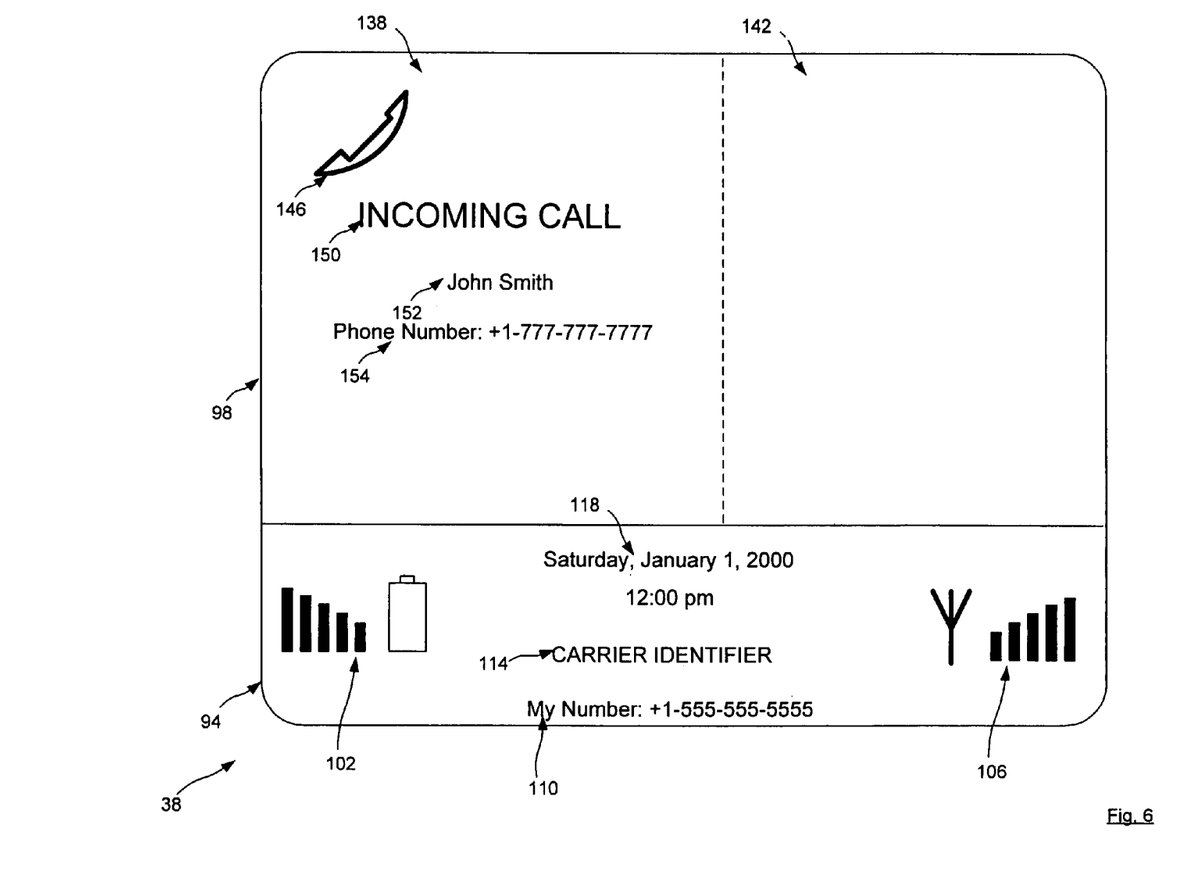
FIG. 6 is a representation of certain information being presented on the display of FIG. 1 during the performance of the method of FIG. 4.

Next, at step 530, particulars about the incoming call are presented on the first sub-region 138. This step is represented in FIG. 6, as display 38 is shown having exemplary calling information being presented in first sub-region 138.

The exemplary calling information first sub-region 138 includes a telephone icon 146, a status line 150, a caller-name line 152, and a caller-id line 154. Telephone icon 146 is a graphical representation of a telephone receiver to indicate to the user that the telephone is active. Status line 150 presents the message "Incoming Call" to tell the user that their phone is ringing. Caller-id line 154 indicates the phone number of the entity that is telephoning device 30. Caller-name line 152 shows the owner name associated with that caller-id 154. Caller-name can be sent by network, or automatically distinguished by address book application 134 on device 30, or "unknown caller" when unavailable. While a specific set of calling information is shown in first sub-region 138, it is to be understood that such information is exemplary and different combinations and/or types of offerings of information can be shown, as desired, according to the features and applications associated with device 30.

Next, at step 535, options about how the incoming call can be processed are presented on the second sub region 142. This step is represented in FIG. 7, as display 38 is shown having exemplary options being presented in second sub-region 142.

The exemplary options in second sub-region 142 includes the option to "ANSWER" shown at icon 158, the option to "ANSWER AND HOLD" shown at icon 162, and the option to "IGNORE", shown at icon 166. The options can be selected by the user by using trackwheel 50 to scroll through each option, and as each option is selected, the option will be highlighted. In FIG. 7, the ANSWER option at icon 158 is highlighted, representing that this is the option that is currently selected. Having selected the desired option, the user can depress trackwheel 50 along path A (shown in FIG. 1) to have that option take effect. ANSWER is used to answer the call in the usual manner, as if a receiver was being lifted off of the cradle of a ringing phone. ANSWER AND HOLD is used to answer the call, but to place it on hold until the user is ready to actually remove the call from hold and participate in the call. IGNORE is used to deny answering the call, and, if device 30 is so enabled, to cause the call to be directed to a voicemail system. While a specific set of options are shown in second sub-region 142, it is to be understood that such options are exemplary and different combinations and/or types of offerings of options can be shown, as desired, according to the features and applications associated with device 30.

Figure 7:
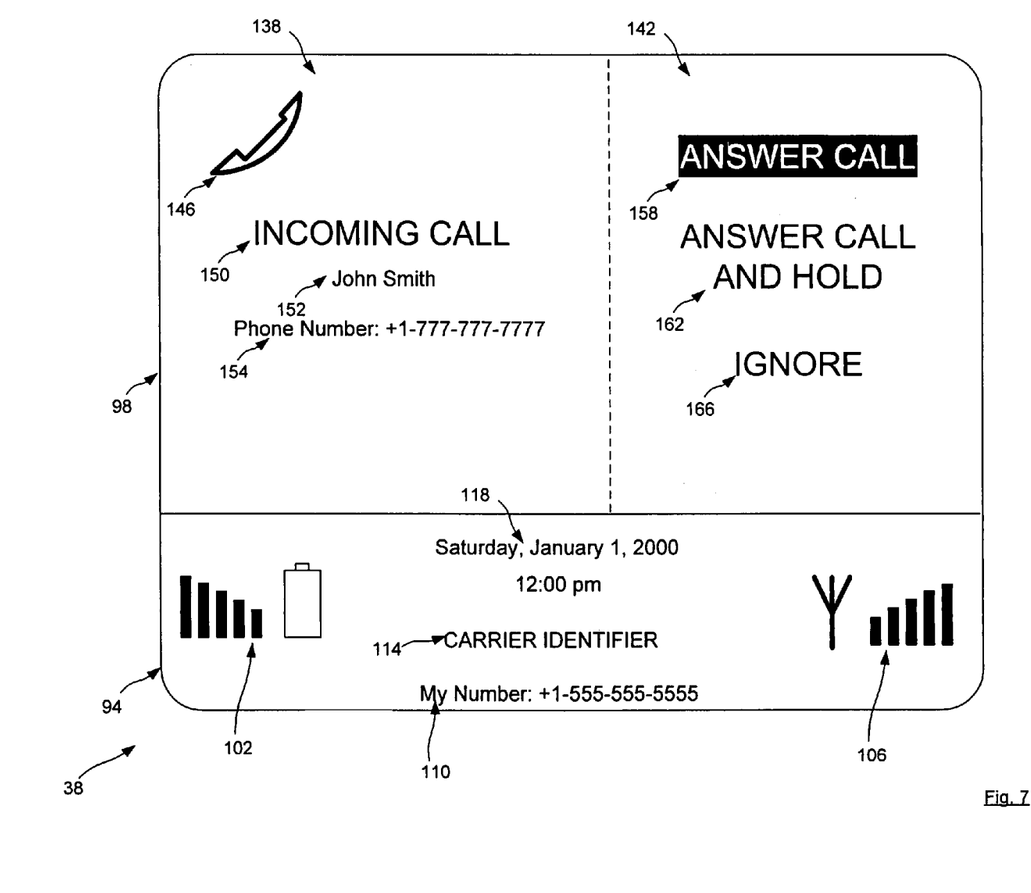
FIG. 7 is a representation of certain information being presented on the display of FIG. 1 during the performance of the method of FIG. 4; and, FIG. 8 is a representation of certain information being presented on the display of FIG. 1 during the performance of the method of FIG. 4.

It will now be understood by those of skill in the art that, typically, from the perspective of the user of device 30, steps 525-535 will occur substantially simultaneously, such that the user is only aware of seeing the information as presented in FIG. 7.

Next, at step 540, a determination is made if the incoming call is answered. If "No," the call is not answered, then method 500 returns to step 515 and display 38 is updated according to the previous description of step 515. If, for example, the user elects to use the "IGNORE" option, or the user fails to answer the call before the caller hangs up, or before the incoming call is automatically forwarded to voicemail, then it will be determined that "No" the call is not answered and method 500 will return to step 515. However, if "Yes", the call is answered, then method 500 will advance to step 545. For example, if the user elects to use the "ANSWER" or "ANSWER AND HOLD" options from step 535, then it is determined at step 540 that the call is answered and method 500 will advance to step 545.

Figure 8:
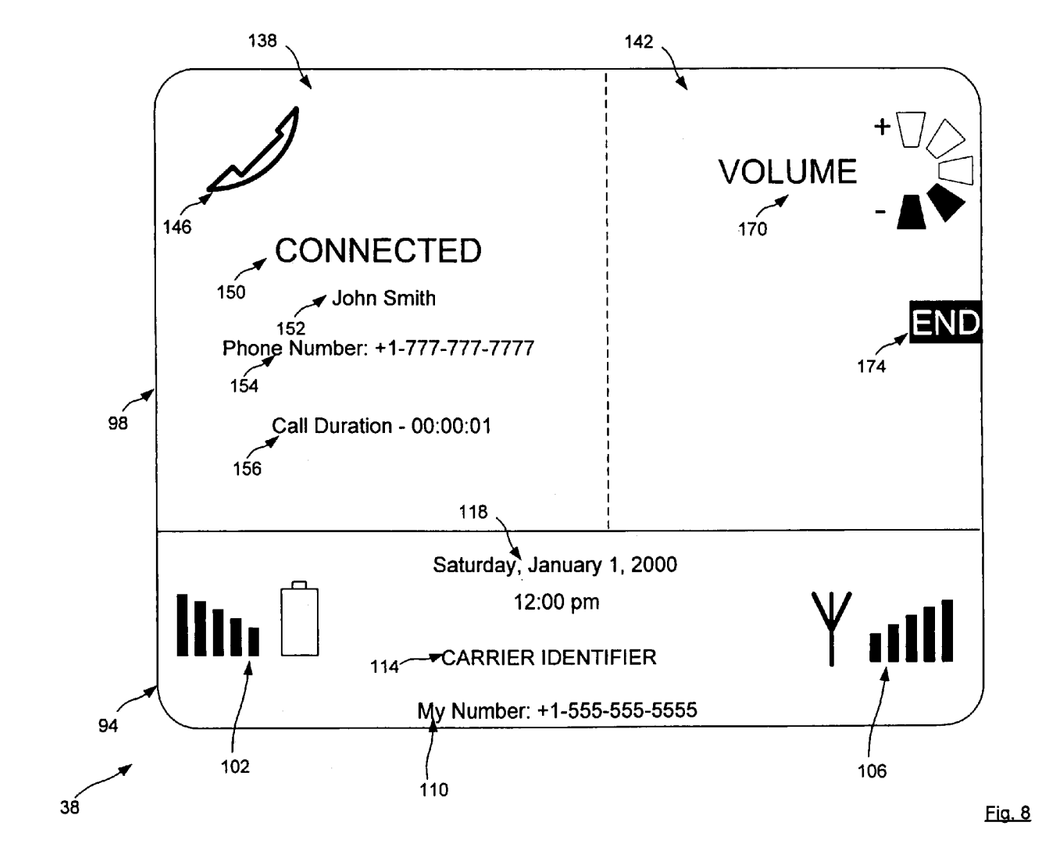

At step 545, the second sub-region is updated to present in call options. This step is represented in FIG. 8, as display 38 is shown having exemplary in call options being presented in second sub-region 142. In the sub-region 128, status line 150 is updated to display "CONNECTED", and a call timer 156 is displayed and increments according to the duration of the call. In a present embodiment, call timer 156 shows time in an hh:mm:ss (i.e. hours:minutes:seconds) format. As the call continues, step 555 keeps the same second region FIG. 8 display layout with call timer 156 in first sub-region updated incrementally. By the same token, first region 94 keeps a layout that is substantially fixed, but periodically refreshes the battery status 102, signal strength 106, data time 118 and carrier 114 as the battery is drained, radio strength is fluctuating, time elapses and roaming occurs, respectively, as may happen throughout the call.

The exemplary in call options in second sub-region 142 in FIG. 8 includes the option to adjust the volume of the call, icon 170, the option to END the call shown at icon 174. Adjusting the volume of the call may be effected by the user by rotating trackwheel 50. Terminating the call by selecting "END" can be effected by depressing exit key 54. While a specific set of options are shown in second sub-region 142, it is to be understood that such options are exemplary and different combinations and/or types of offerings of options can be shown, as desired, according to the features and applications associated with device 30.

Next, at step 550, a determination is made if the incoming call is finished. If "No", then method 500 advances to step 555, where the screen regions are update according to pertinent changes, and then continuously loops back to step 550. If the determination at step 440 is "Yes", then method 500 returns to step 515, and display 38 is updated according to the previous description of step 515, returning display 38 to the appearance of display 38 as it was prior to the receipt of the incoming call, for example, as display 38 is shown in FIG. 3. While the embodiments discussed herein are directed to specific implementations of the invention, it will be understood that subsets, combinations and variations of the embodiments are within the scope of the invention. For example, other types of device functions other than the processing of incoming calls may be effected by presenting information according to an appropriately modified version of method 500. It should also be understood that the particular layouts, configurations, shapes, dimensions, and spatial relationships of the regions are not particularly limited. For example, first sub-region 138 and second sub-region 142 can be laid out so that first sub-region 138 vertically above or below second sub-region 142.

Figure 4:
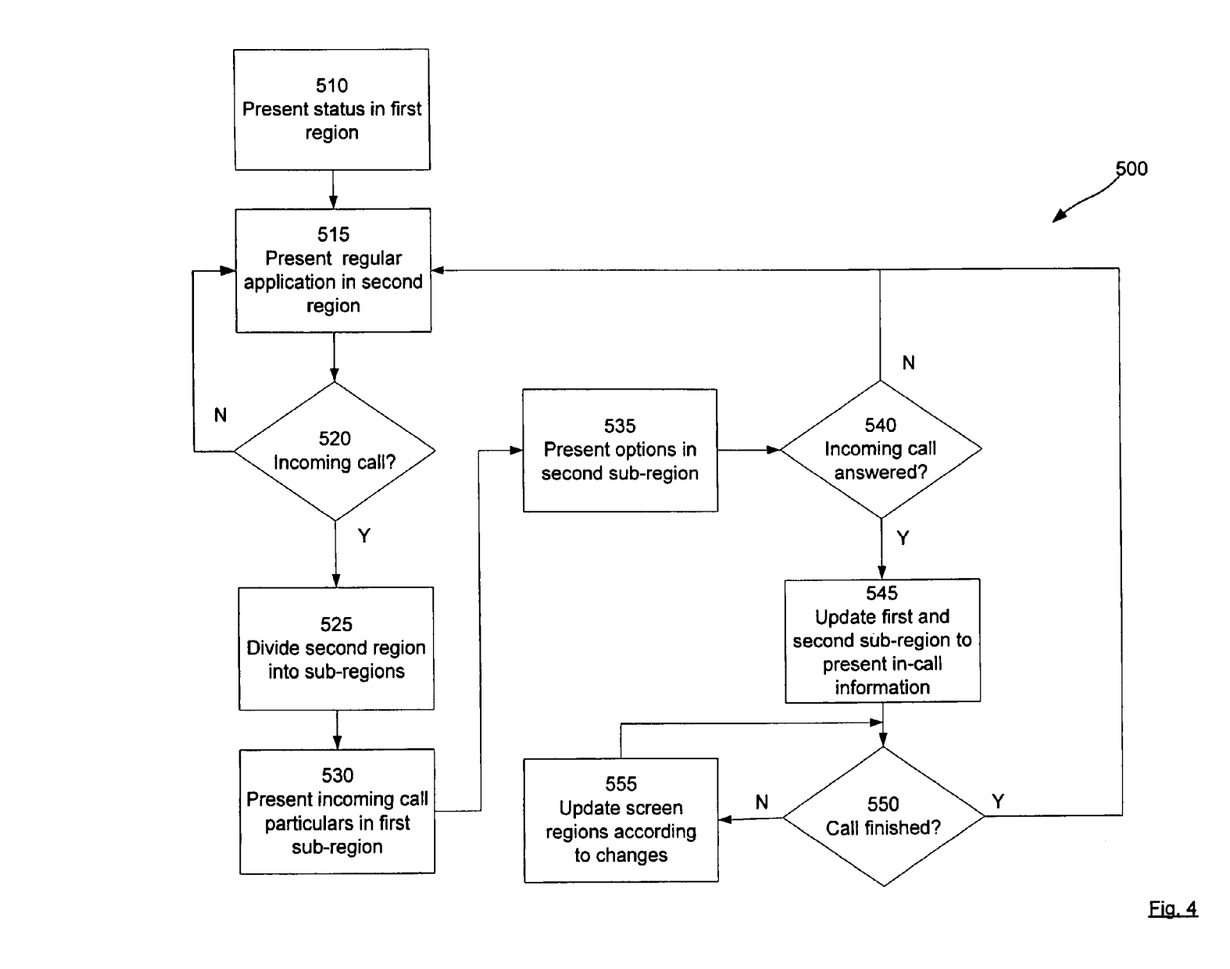
FIG. 4 is a flowchart depicting a method of presenting information in accordance with an embodiment of the invention.

It should also be understood that the sequence of steps in method 500 of FIG. 4 may be varied. For example, step 510 can be performed after step 520, wherein the status of the first region is only updated and/or presented once an incoming call is received.

The above-described embodiments of the invention are intended to be examples and alterations and modifications may be effected thereto, by those of skill in the art, without departing from the scope defined by the claims appended hereto.

The invention claimed is:

1. A method of displaying information on a mobile communications device having a display comprising:
    displaying, on the display, at least three regions where the contents of each region is controllable separately from the other regions and where the each region is displayed concurrently;
    displaying a first set of information in a first region comprising at least one of status information about the mobile communications device or a main menu;
    displaying a second set of information in a second region comprising information corresponding to a call that is one of an incoming call or an ongoing call;
    displaying a third set of information in a third region comprising an option set, the option set being a plurality of options operable on the call, and where the option set is dynamically changeable by substituting the displayed options for at least one other set of options between the receiving of the call and the termination of the call, such that when said incoming call is received, said option set comprises options about how said incoming call can be processed, and when said incoming call is answered said option set is dynamically configured to in-call options, said in-call options determined according to applications associated with the mobile communications device, wherein the in-call options include adjusting the volume.

2. The method according to claim 1 wherein the first set of information comprises status information about the mobile communications device.

3. The method according to claim 2 wherein the first set of information comprises a telephone number of said mobile communications device.

4. The method according to claim 2 wherein the first set of information comprises a current time and date.

5. The method according to claim 2 wherein the first set of information comprises information indicative of a signal strength, the signal strength being between the mobile communications device and at least one wireless base station serving said device.

6. The method according to claim 5 wherein the first set of information comprises information indicative of a carrier operating said at least one wireless base station.

7. The method according to claim 2 wherein the first set of information comprises information indicative of remaining battery life.

8. The method according to claim 1 wherein the first region occupies at least about ten percent of the display.

9. The method according to claim 1 wherein the first region occupies at least about fifty percent of the area of the display.

10. The method according to claim 1 wherein the first region occupies between about ten percent and about ninety percent of the area of the display.

11. The method according to claim 1 wherein the second and third regions are similar in size.

12. The method according to claim 1 wherein the second region is about twice the size of the third region.

13. A non-transitory computer-readable storage medium containing a set of instructions for an electronic device having a display, the set of instructions comprising functionality of:
controlling the display to present a first set of information in a first region of said display, the first set of information comprising at least one of status information about the electronic device or a main menu;
controlling the display to present a second set of information in a second region of the display, the second set of information comprising information corresponding to a call that is one of an incoming call or an ongoing call;
controlling the display to present a third set of information in a third region of the display, the third set of information comprising a plurality of options operable on the call, and where the option set is dynamically changeable by substituting the displayed options for at least one other set of options between reception of the call and the termination of the call, such that when said incoming call is received, said option set comprises options about how said incoming call can be processed, and when said incoming call is answered said option set is dynamically configured to in-call options, said in-call options determined according to applications associated with the electronic device, wherein the in-call options include adjusting the volume; and
where the contents of each region is controllable separately from the other regions and where the each region is displayed continually along with the other regions between reception of the call and the termination of the call.

14. A telephonic electronic device comprising:
a display for displaying information thereon;
a processor operatively coupled to the display, the processor configured to enable functionality comprising controlling the display to present a first set of information in a first region of said display, said first set of information comprising at least one of status information about the telephonic electronic device or a main menu, controlling the display to present a second set of information in a second region of the display, the second set of information comprising information corresponding to a call that is one of an incoming call or an ongoing call, controlling the display to present a third set of information in a third region of the display, the third set of information comprising a plurality of options operable on the call, making the option set dynamically changeable by substituting the displayed options for at least one other set of options between reception of the call and the termination of the call, such that when said incoming call is received, said option set comprises options about how said incoming call can be processed, and when said incoming call is answered said option set is dynamically configured to in-call options, said in-call options determined according to applications associated with the telephonic electronic device, wherein the in-call options include adjusting the volume; and
where the processor controls each region separately from the other regions while keeping each region displayed continually along with the other regions between reception of the call and the termination of the call.

15. The device of claim 14 wherein the first set of information comprises status information about the telephonic electronic device.

16. The device of claim 14 wherein the first set of information comprises information indicative of a signal strength, the signal strength being between the telephonic electronic device and at least one wireless base station serving said telephonic electronic device.

17. The device of claim 16 wherein the first set of information comprises information indicative of a carrier operating said at least one wireless base station.

18. The device of claim 14 wherein the first set of information comprises information indicative of remaining battery life.

19. The device of claim 14 wherein the first set of information comprises a telephone number of said telephonic electronic device.

20. The device of claim 14 wherein the first set of information comprises a current time and date.

21. The device of claim 14 wherein the first region occupies about ten percent of the display.

* * * * *